B. A. ADLER.
DIFFERENTIAL CLUTCH MECHANISM.
APPLICATION FILED JULY 30, 1915.
1,224,124.
Patented May 1, 1917.
2 SHEETS—SHEET 1.
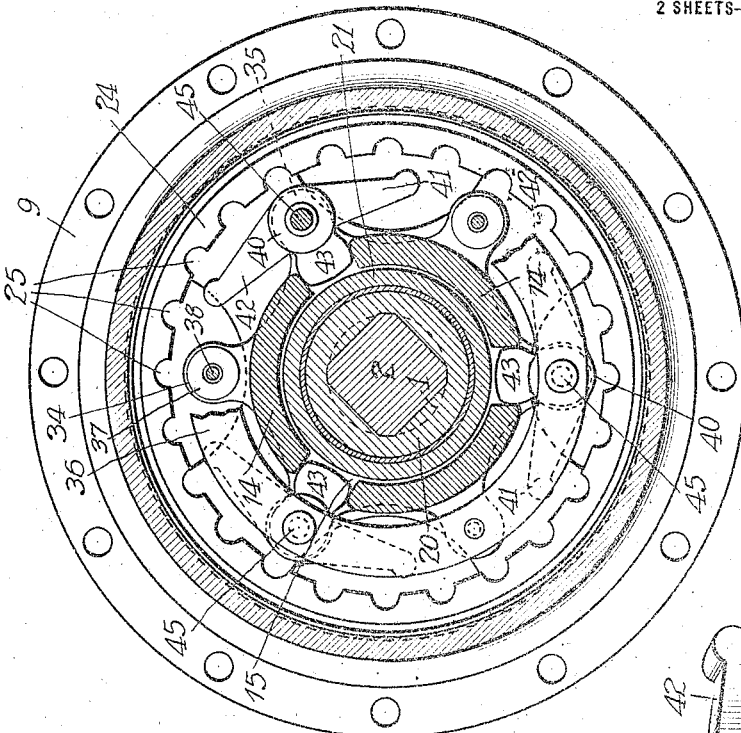

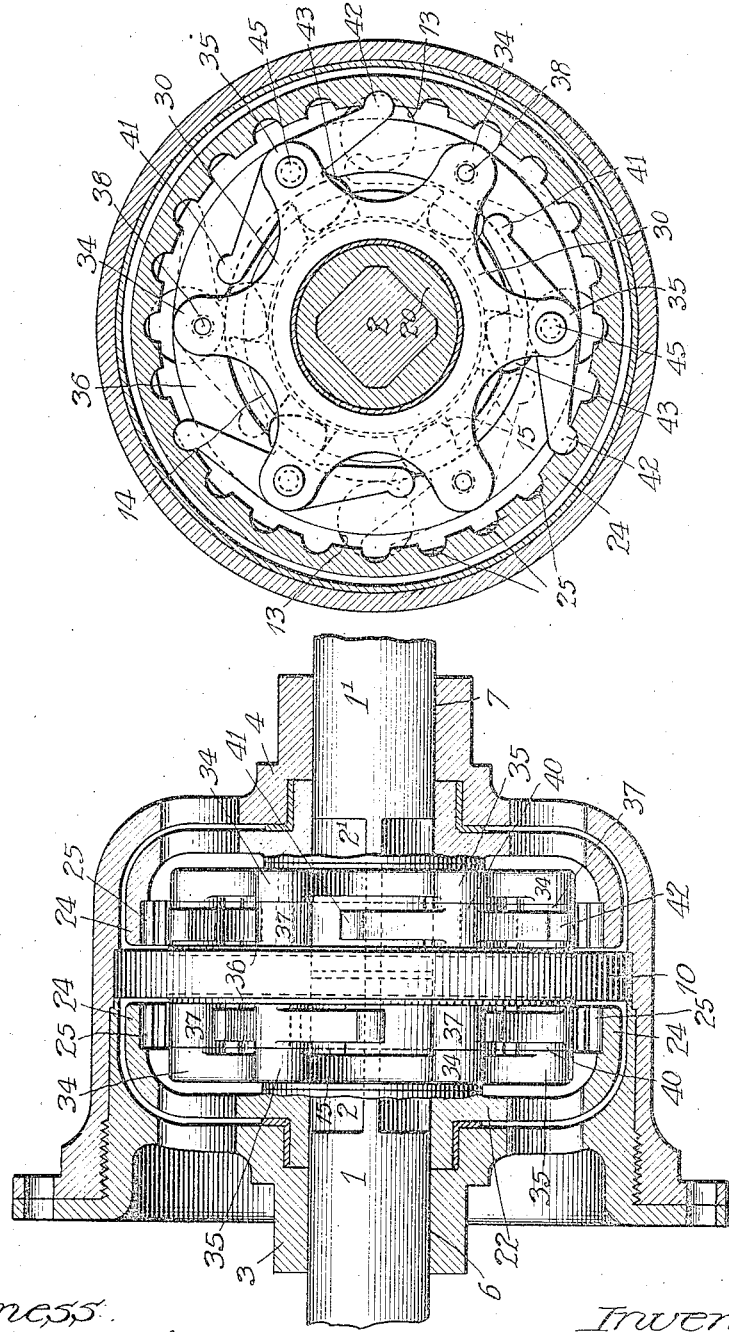

UNITED STATES PATENT OFFICE.

BROR A. ADLER, OF CHICAGO, ILLINOIS, ASSIGNOR TO PETER A. LORENZ, OF CHICAGO, ILLINOIS.

DIFFERENTIAL CLUTCH MECHANISM.

1,224,124. Specification of Letters Patent. Patented May 1, 1917.

Application filed July 30, 1915. Serial No. 42,712.

*To all whom it may concern:*

Be it known that I, BROR A. ADLER, a subject of the King of Sweden, residing at the city of Chicago, in the county of Cook and State of Illinois, have invented certain new and useful Improvements in Differential Clutch Mechanisms, of which the following is a specification.

My invention relates to those devices which are used to transmit the power of an engine or motor to the driving wheels of a moving vehicle. As is well known, the application of such power to the separate and independently mounted driving wheels of automobiles, is a relative one. The application of power to each wheel is dependent upon the fact that the other wheel also has a grip upon the roadway. In practice, no more power can be transmitted to either wheel than is transmitted to the other wheel. This condition results in a very uncertain application and in many cases to a great loss of power. It is the object of my invention to provide means by which the full power from the primary source thereof is transmitted equally to the wheels while having an equal grip upon the roadway, but which is also capable of transmitting full power to the wheel retaining frictional contact even though the other wheel has no such contact.

The principles of my invention are illustrated in the drawings, in which Figure 1 is a longitudinal section of my improved differential.

Fig. 2 is a cross section thereof on the dotted line 2—2.

Fig. 3 is an enlarged perspective of a transmission dog.

Fig. 4 is a view similar to that in Fig. 1, showing a portion of the working parts in elevation.

Fig. 5 is a cross section of Fig. 1, on the dotted line 5—5.

Further describing my invention with reference to the drawings in which like characters of reference denote like parts throughout, 1 and 1' are two parts of a divided axle having the squared inner ends 2 and 2'. The two parts of said axle are supported in alinement with each other by a casing and suitable bearings, in any well known manner. A shell or casing consisting of the parts 3 and 4, which are adapted to be fitted together and which may be secured in proper relative position at 5, may be journaled on the shaft at 6 and 7. The related flanges 8 and 9 provide means by which an annular beveled gear may be attached and by which the same may be driven by a suitable pinion receiving its power from the engine or motor.

Within the shell or casing described is an annular driving element 10 having the peripheral portion 11 closely fitted within and positively secured to the said casing. A web 12 is inwardly extended being provided with a multiplicity of openings 13 to allow free circulation of oil for lubrication of the parts. On each side of the said driving element or disk 10 is extended a sleeve comprising parts 14 and 14', having the notches 15 or other equivalent means for operative engagement with the dogs hereinafter to be described. A driven element 20 comprises a hub 21 internally squared to receive the ends of the shaft sections and the outwardly extending flanges 22 having the oil opening 23 and the inwardly projecting overhung portions 24. Within such overhung portions is a series of notches 25 forming an annular rack.

An intermediate member 30 comprising the hub 31 and the peripheral flange 32, is adapted to be journaled upon the hubs 21 and may be provided with the anti-friction metal bushings 33. The flanges 30 may be continuous or may be interrupted to form a series of arms 34 and 35 for the purpose hereinafter explained. Stay rings 36 having an outer diameter substantially corresponding to the diameter of the intermediate member 30, are mounted in spaced relation to the said intermediate members by means of the spacing blocks 37 and the screws 38 or other suitable securing means. Such attachment as shown is through the arms 34, which are placed at 120 degrees from each other. Midway between the points of attachment last described and between arms 35 and the ring 36 are mounted dogs having hubs 40, the lateral arms 41 and 42 and the transversely extended arm 43. The said dogs are retained in position between the arms 35 and the stay ring 36, by means of a pivot bolt 45 or other device. When in this position, the transverse arm 43 is adapted to be received within the notches 15 of the sleeve or collar extended from the driving element 11. When in neutral position as shown in Fig. 2, the laterally extended arms 41 and 42 of said dogs will be out of engagement with the notches in rack 24. But when the driving element is turned, for instance as shown in Figs. 4 and 5, to the right, the forwardly extended arms 42 of the dogs will be turned outwardly to engage with notches 25, forming the annular rack within the flanges of the driven element, as shown in said figure, thereby transmitting the power to the driven element and thence to the shaft.

It will be noted that in the structure described, the power of the driving element is transmitted in a direct line and in the same plane to the engaged portion of the driven element. The transmission is directly from the rear portion of the transverse arm of Fig. 3 to the forward part of the laterally extended engaged arms 42 of the dogs 40. Little or no force and practically no side strain whatever are thrown upon the intermediate element, which acts only as a spacing device to keep the movable elements of the structure in their proper relative positions both of engagement and disengagement.

I have shown and described my invention with reference to a differential, in which the separate clutching devices are contained within one structure whereby it is applicable to the adjacent ends of a two piece shaft. It is clear, however, that the clutch devices are adapted to be used independently of each other and that the operation of the individual clutches will be the same when power is applied to the driving element. By the necessary changes which will occur to any mechanic, the differential may be divided and the clutches constituting it, placed at the outer ends of an ordinary automobile rear shaft, or they may be applied and used for the purpose of giving independent movement to independently mounted wheels, as for instance, to the front wheels of an automobile.

I am not, therefore, to be limited to the combinations or uses shown, but claim as well the independent clutch device in whatever application may be made thereof.

I claim:

1. In a differential clutch mechanism; a combination of a driven element having an annular rack, a driving element having a member extended into the plane of said rack, and a dog interposed between said rack and said member provided with a transverse off-set engageable with the said member whereby it may be turned by the motion of said member to engage said rack and impel it in the same direction.

2. In a differential clutch mechanism; the combination of a driven element having an annular rack, a driving element having a member extended into the plane of said rack, a revoluble dog support interposed between said elements, and a dog mounted thereon provided with a transverse off-set engageable with the said member whereby it may be turned to engage said rack and impel it in the same direction.

3. In a differential clutch mechanism; the combination with a driven element having an annular rack and a driving element having a sleeve extended in the plane of said rack, of a dog having lateral arms adapted alternately to engage said rack and a transverse arm operatively engageable with said sleeve.

4. In a differential clutch mechanism; the combination of a driven element having an internal annular rack, a driving element having a sleeve extended into the plane of said rack, a revolubly mounted dog support between the said elements, and a dog pivoted on said support and engageable with the said sleeve whereby it may be turned by the motion of said sleeve alternatively to engage said rack and to impel it in the same direction.

5. In a differential clutch mechanism; the combination of a driven element having an internal annular rack, a driving element having a sleeve extended into the plane of said rack, a revolubly mounted dog support between the said elements and a dog pivoted on the said support and having lateral arms adapted alternatively to engage said rack and a transverse arm operatively engageable with the said sleeve.

6. In a differential clutch mechanism; the combination of a shell journaled on the proximate ends of a two piece shaft, a plurality of driven elements irrevolubly mounted on the ends of said shafts and provided with radial flanges having inwardly projecting overhung portions, a driving element secured to said shell between the said driven elements and having outwardly extended sleeves, dogs adapted to engage the overhung portions of the driven elements and the outwardly extended sleeves of the driving element in substantially the same transverse planes, and means for pivotally holding said dogs in said engaging relation.

7. In a differential clutch mechanism, the combination of a shell journaled on the proximate ends of a two piece shaft, a plurality of driven elements irrevolubly mounted on the ends of said shafts and provided with radial flanges having inwardly projecting overhung portions, a driving element secured to said shell between the said driven elements, and having outwardly extended sleeves, a transmission element rotatably mounted between the driving and driven elements and having radial flanges, and dogs pivoted to said flanges and provided with lateral arms adapted to engage the inwardly extended portions of the driven elements and having transverse arms adapted to engage the sleeves of the driving element.

8. In a differential clutch mechanism; the combination of a shell journaled on the proximate ends of a two piece shaft, a plurality of driven elements irrevolubly mounted on the ends of said shafts and provided with inwardly facing hubs, said elements being further provided with radial flanges having inwardly projecting overhung portions, a driving element secured to said shell between the said driven elements, and having outwardly extended notched sleeves, a transmission element journaled on the hubs of the driving element and having radial flanges, and dogs pivoted to said flanges and provided with lateral arms adapted to engage the inwardly extended portion of the driven element and having transverse arms adapted to engage the sleeves of the driving element.

9. In a differential clutch mechanism; the combination of a shell journaled on the proximate ends of a two piece shaft, a plurality of driven elements irrevolubly mounted on the ends of said shafts and provided with inwardly facing hubs, said elements being further provided with radial flanges having inwardly projecting overhung portions, a driving element secured between the said driven elements, and having outwardly extended notched sleeves, a transmission element journaled on the hubs of the driving element and having radial flanges, stay rings secured to the said flanges in spaced relation thereto, and dogs pivoted between said flanges and stay rings provided with lateral arms adapted to engage the inwardly extended portion of the driven element and having transverse arms adapted to engage the sleeves of the driving element.

In witness whereof, I have hereunto subscribed my name, this 16th day of July, 1915, in the presence of two subscribing witnesses.

BROR A. ADLER.

Witnesses:
C. K. CHAMBERLAIN,
W. HARDING.